Patented Jan. 5, 1954

2,665,302

UNITED STATES PATENT OFFICE 2,665,302

SPIROCYCLOHEXANES AND METHODS OF PREPARATION THEREOF

Gilbert Forrest Woods, Jr., and Louis H. Schwartzman, Silver Spring, Md.

No Drawing. Application November 24, 1951,
Serial No. 258,092

6 Claims. (Cl. 260—479)

This invention relates to compounds of the spirocyclohexane type and methods of preparation thereof.

More particularly, the invention relates to the synthesis of compounds of the spirocyclohexane type, particularly those having analgesic properties such as possessed by morphine and other opiates derived from natural sources.

Considerable effort has been directed in the past toward the synthesis of suitable analgesics as substitutes for morphine and the like, particularly in view of the fact that the principal source of supply of morphine and related compounds is dependent upon natural sources, most of which are presently located in the Orient. In an effort to produce chemically synthesized analgesics domestically on an economically practicable basis, and to provide a source of analgesics independent of natural supplies of raw materials, many attempts have been made to synthesize various analgesics as substitutes for morphine and the like, some of the more recently developed compounds being

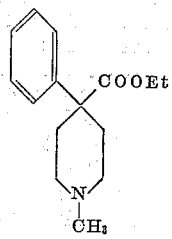

Demerol

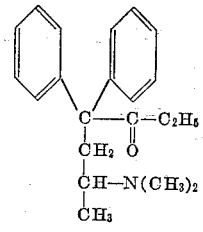

Methadon etc.

Among other things, it has been found that many synthetic compounds produced hereto- fore, although having some of the analgesic properties of morphine and the like, are not satisfactory from the standpoint of manufacturing costs, and even in some cases are unsuitable for use by human beings because of their high toxicity or side-effects and other undesirable properties.

It is found that compounds of the present invention are not only relatively simple and inexpensive to manufacture from readily available raw materials but, in addition, have satisfactory analgesic properties and are of sufficiently low toxicity to permit safe use by human beings.

In its more specific aspects the present invention pertains to the synthesis of analgesic compositions of the spirocyclohexane type by employing cyclohexanone as a starting material and producing therefrom a large number of new, novel and useful analgesic compounds containing a quaternary carbon atom in the molecule and, in addition, either a primary, secondary, or tertiary amine group.

The invention also provides new and novel methods of preparing the compounds described herein, such methods being particularly advantageous in view of the simplicity of the procedures, economic practicability and comparatively high yields of the intermediates and the end products without the use of complicated or expensive starting materials, apparatus, or processes.

The intermediates required for synthesis of the compounds of the present invention may be prepared, for example, in the manner described in copending application Serial No. 150,806, filed March 20, 1950, now Patent No. 2,586,486, by using cyclohexanone as a starting material, treating it with a mixture of calcium carbide and potassium hydroxide to yield an acetylenic glycol such as 1,1'-ethynylene-bis-cyclohexanol according to the reaction:

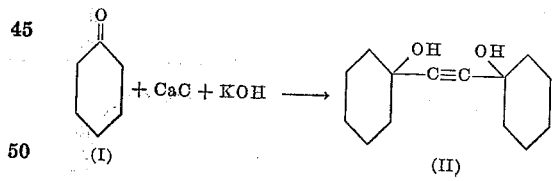

This glycol (II) is then dehydrated to the dieneyne (III) by, for instance, heating the above glycol under reflux conditions with dilute sulfuric acid as follows:

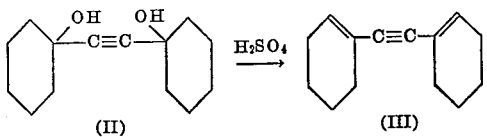

The compound thus obtained is then cyclized and hydrated, for example, by refluxing with formic acid, thus producing as intermediates, cyclic ketones such as spiro[cyclohexane-1,1'-Δ9'-tetrahydroindanone-3'] (IV) and its isomer spiro[cyclohexane - 1,1' - Δ8' - tetrahydroindanone-3'] (V) in accordance with the following reaction:

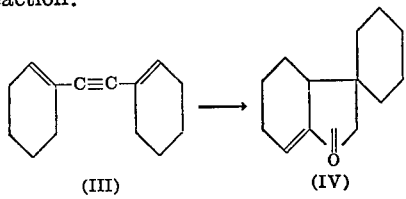

and/or

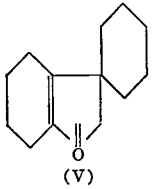

To produce the analgesic compounds of the present invention, the cyclic ketones (IV) and/or (V) are converted to the ketone (VI) and subsequently to its oxime (VII) according to the reaction:

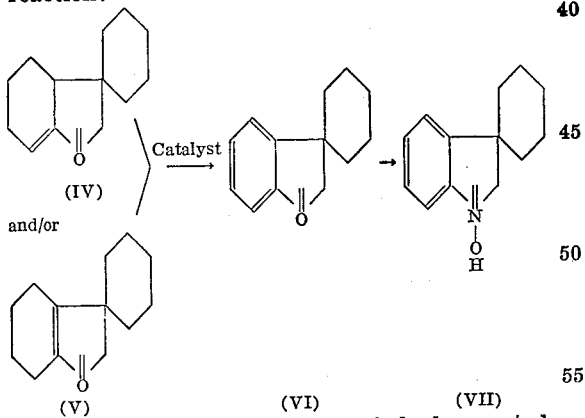

and thereafter the oxime (VII) is hydrogenated in the presence of a catalyst to produce an analgesic spiroindane in accordance with the reaction:

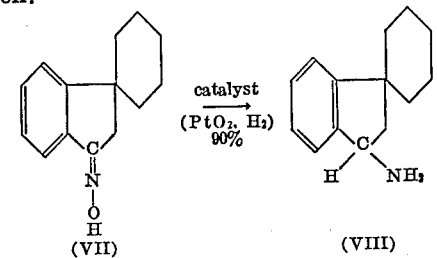

By further treatment of the spiroindane (VIII) according to the following reaction, compound (IX) is obtained, this compound being an important intermediate for the preparation of the compounds of the present invention:

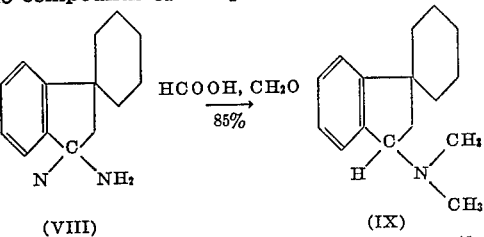

The compounds (VIII) and (IX) and methods of preparation thereof are disclosed and claimed in copending application Serial No. 150,808, filed March 20, 1950, now Patent No. 2,585,969.

The compounds of the present invention, as distinguished from those disclosed and claimed in said copending applications Serial Nos. 150,808, now Patent No. 2,585,969, and 150,810, now abandoned, each filed March 20, 1950, in that the present compounds are substituted spirocyclohexanes of the type:

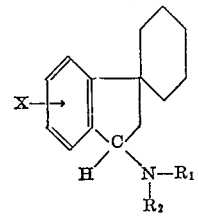

wherein R₁ and R₂ are selected from the group consisting of hydrogen and lower alkyl groups and X is selected from the group consisting of halogens, amino groups, hydroxyl, nitro, alkoxy groups, nitrile, N-substituted aminomethyl groups, O-acyl groups, acyl groups, alkyl carbinol groups, and alkyl carbinol ester groups.

A series of compounds of the substituted spirocyclohexane type coming within the scope of the present invention may be prepared, for example, by the following illustrative reactions:

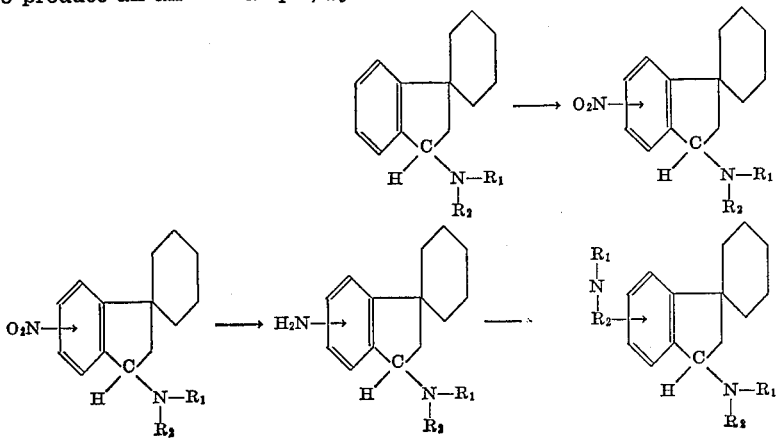

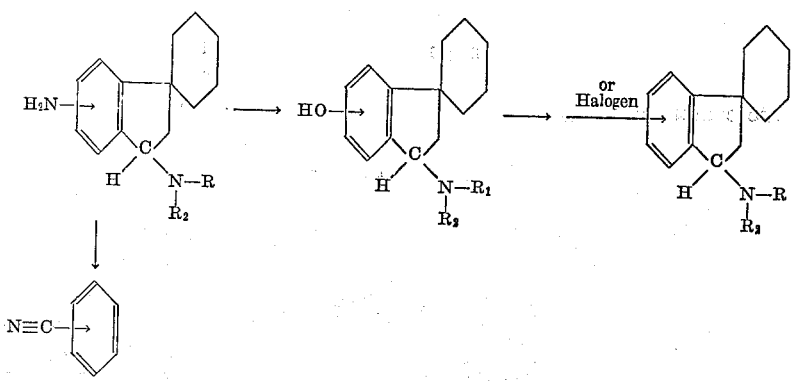

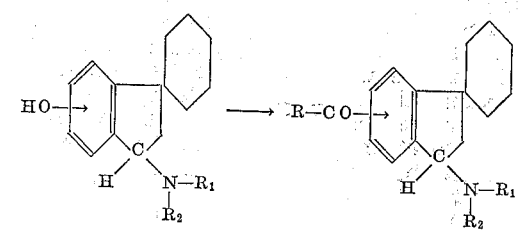

or

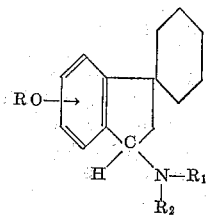

It is an object of the present invention, therefore, to provide a series of substituted spiroindanes. More particularly it is an object to provide substituted spiroindanes having analgesic properties. It is a further object of the present invention to provide a series of substituted spiroindanes having a quaternary carbon atom and, in addition, a primary, secondary or tertiary amine group in the molecule. It is a still further object of the present invention to provide methods of preparation of the compounds of the invention.

For purposes of illustration, but without intending to limit the scope of the patent thereto, representative methods and compounds of the present invention are described in the following examples:

EXAMPLE I

A compound of the type:

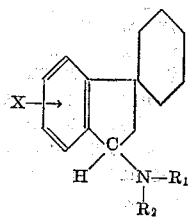

wherein X is the nitro group and $R_1$ and $R_2$ are methyl groups is illustrated as follows:

A mixture of 5 grams of the amine, spiro[cyclohexane - 1,1' - 3' - dimethylaminoindane], prepared in accordance with application Serial No. 150,808, now Patent No. 2,585,969, referred to herein above, in 100 ml. carbon tetrachloride is cooled to 0° C. and with vigorous stirring, 9.4 ml. of concentrated sulfuric acid is added dropwise. The mixture is cooled to —3° C., and a solution of 2.75 grams of potassium nitrate in 8.4 ml. of concentrated sulfuric acid is added dropwise with vigorous stirring over a period of 20 minutes. The temperature at the end of the addition was 0° C., the resulting two phase system is stirred at this temperature for an hour and the carbon tetrachloride layer decanted away. Upon pouring the brown oil with stirring onto ice, a precipitate is formed which is difficult to filter. Therefore, it is neutralized with ammonium hydroxide and extracted with ether. This extract is dried and filtered. Absolute alcohol (10 ml.) saturated with hydrogen chloride gas is added to the filtered dry ether extract to give 7 grams of spiro[cyclohexane - 1,1' - 3' - dimethylamino-x-nitroindane] hydrochloride. This is clarified and crystallized from alcohol-ether to give 4 grams of material melting at 258–260°.

The free amine, spiro[cyclohexane-1,1'-3'-dimethylamino-x-nitroindane] boils at 182–185° C. at 1.8 mm. This compound has the formula:

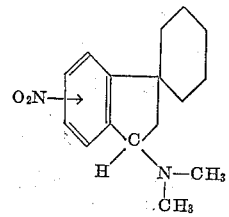

EXAMPLE I(a)

A compound having the formula:

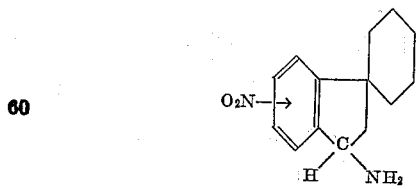

may be prepared as follows:

Spiro[cyclohexane - 1,1' - 3'-amino-x-nitroindane]. This compound was prepared in a manner similar to that for spiro[cyclohexane-1,1'-3'-dimethylamino-x-nitroindane] in 59% yield by nitrating the primary amine, spiro[cyclohexane-1,1'-3'-aminoindane]. The nitroamine after recrystallization from methanol-water mixtures and sublimation at reduced pressure melted at 97–99° C. The amine hydrochloride formed in the usual manner and recrystallized from alcohol-ether mixtures melted at 268–273° (decomp.).

EXAMPLE II

An extremely effective analgesic compound of the type:

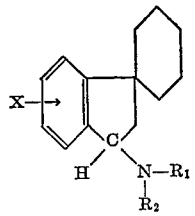

wherein X is the amino group and $R_1$ and $R_2$ are lower alkyl groups may be prepared as follows:

A mixture of 3.7 grams of spiro[cyclohexane-1,1'-3'-dimethylamino-x-nitroindane] hydrochloride dissolved in 50 ml. of 95% alcohol is stirred and refluxed. To this refluxing mixture, 17.7 grams of $SnCl_2 \cdot 2H_2O$ dissolved in 16.9 ml. concentrated hydrochloric acid and 21 ml. 95% alcohol is added over a period of twenty minutes. After boiling for an additional thirty minutes, the alcohol is removed under reduced pressure and the resulting complex is decomposed with a large excess of aqueous potassium hydroxide. The solution is then extracted with ether, the ether is dried over magnesium sulfate and upon distillation of the dried ether extract under reduced pressure 2.9 grams of solid di-amine is obtained as a residue. The di-amine, spiro[cyclohexane-1,1'-x-amino-3'-dimethylaminoindane], is sublimed at 120° C. and 1 mm. This affords a white crystalline sample melting at 114–116° C. The compound has the formula:

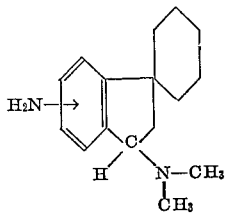

This compound possesses the analgesic effects on white mice described in the following chart:

M. E. D.:
    5 mg./kg. body weight.
L. $D_{50}$:
    75 mg./kg. body weight.

EXAMPLE II(a)

A compound having the formula:

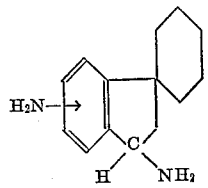

Spiro[cyclohexane-1,1'-x-amino-3'-aminoindane] was prepared in 90% yield by the reduction of spiro[cyclohexane-1,1'-3'-amino-x-nitroindane] in methanol at room temperature and two atmospheres of hydrogen pressure with Adams' catalyst. This crystalline diamine, after recrystallization from ether-petroleum ether (20–40°) and sublimation at reduced pressure, melted at 129–131°.

EXAMPLE III

A compound having the formula:

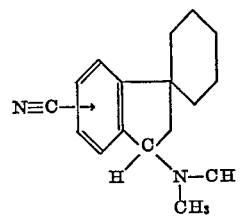

may be prepared as follows:

Spiro[cyclohexane-1,1'-x-cyano-3'-dimethylaminoindane]. A solution of 10 g. (.041 mole) of the diazonium salt of spiro[cyclohexane-1,1'-x-amino-3'-dimethylaminoindane] cooled to 0° was carefully neutralized with sodium bicarbonate. This solution was added dropwise to a freshly prepared mixture of 0.041 mole of cuprous cyanide covered with 200 ml. of toluene which was cooled to 0° and vigorously stirred. After the addition the mixture was stirred for one-half hour at 0°, four hours at room temperature, and finally heated to 50° for three hours. The cooled mixture was made alkaline with sodium hydroxide and extracted with ether. The organic layer was extracted with dilute hydrochloric acid. The aqueous layer was neutralized, extracted with ether, dried, and the dried ether layer was concentrated under reduced pressure to yield 8 g. of a dark brown oil. The hydrochloride, made by passing hydrogen chloride gas into an ether solution of the amine, was dissolved in alcohol and treated with a few grams of stannous chloride and hydrochloric acid and finally charcoal to effect an efficient decolorization. The slightly yellowish hydrochloride was recrystallized from alcohol and melted at 257–260°.

The free cyanoamine, spiro[cyclohexane-1,1'-x-cyano-3'-dimethylaminoindane], was regenerated with dilute ammonium hydroxide and after recrystallization from petroleum-ether (20–40°) and sublimation at reduced pressure melted at 81–82°.

EXAMPLE IV

A compound of the type:

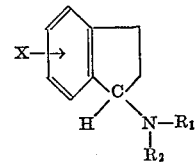

wherein X is the hydroxyl group and $R_1$ and $R_2$ are methyl groups may be prepared as follows:

3.5 grams of spiro[cyclohexane-1,1'-x-amino-3'-dimethylaminoindane] prepared in accordance with the procedure of Example II, is dissolved in a solution of 2.2 ml. concentrated sulfuric acid in 75 ml. water, is cooled to 0° C., with an ice-salt bath and is stirred vigorously. Then 1.1 grams of sodium nitrite in 10 ml. of water cooled to 0° C. is added dropwise over a period of ten minutes. After destroying the excess nitrous acid with urea, 5 ml. of concentrated sulfuric acid in 5 ml. of water is added and the mixture is heated on the steam bath to 97° C. for one hour. Clarification of the red aqueous solution with charcoal and subsequent cooling yields 1.75 grams of the white crystalline phenolic amine sulfate. The crystals are recrystallized twice from about 400 ml. of boiling water, to give colorless material which melts at 250–255° C. Analysis showed this compound to be the dihydrate of the amine sulfate. Upon addition of ammonium hydroxide to this material and subsequent crystallization from alcohol-water mixtures spiro[cyclohexane-1,1'-3'-dimethylamino-x-hydroxy-indane] is obtained which melts at 170–172° C.

This compound has the formula:

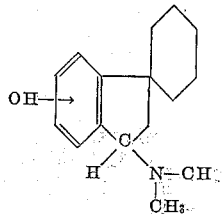

EXAMPLE V

A compound of the type:

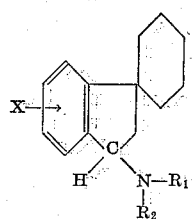

wherein X is the hydroxyl group and $R_1$ and $R_2$ are hydrogen may be prepared as follows:

A solution of spiro[cyclohexane-1,1'-indanone-3'] (18.2 g.) dissolved in 100 ml. of concentrated sulfuric acid is cooled to 0° C. To this is added dropwise 10 g. of potassium nitrate dissolved in 30 ml. of concentrated sulfuric acid with stirring over a period of 1¼ hours, after which the stirring was continued for an additional hour at 0° C. The reaction mixture is then poured with vigorous stirring onto ice. The yellow solid precipitate of nitroketone is filtered and the solid fractionally crystallized from acetone and 18 g. of material melting at 193–195° is obtained. Further crystallization from benzene yields hexagonal, slightly yellow crystals of spiro[cyclohexane - 1,1' - x - nitroindanone - 3'] melting at 195–195.5°.

A solution of spiro[cyclohexane-1,1'-x-nitroindanone-3'] (14.1 g.) in 90 ml. of 95% alcohol is stirred and refluxed; to this is added in dropwise manner a solution of 41 g. $SnCl_2 2H_2O$ in 40 ml. of concentrated hydrochloric acid and 20 ml. of 95% alcohol. After refluxing for an additional thirty minutes, the solvent is removed under reduced pressure and the complex decomposed with a large excess of concentrated potassium hydroxide solution. The alkaline solution is extracted with ether, the ether extract dried and the dry extract is distilled under reduced pressure to leave as a residue, spiro[cyclohexane-1,1'-x-aminoindanone-3']. After crystallization of the residue from benzene-petroleum ether mixtures and subsequent sublimation at 120° C. at 0.5 mm., 11 g. of the aminoketone is obtained which melts at 125–126° C.

Spiro[cyclohexane - 1,1' - x-aminoindanone-3'] (10.5 g.) in a solution of 11 ml. of concentrated sulfuric acid and 80 ml. of water is diazotized at 3–5° C. with 3.5 g. $NaNO_2$ in 20 ml. of water over a period of thirty minutes. After decomposition of the excess nitrous acid with urea, the solution is filtered and, after addition of 5 ml. of concentrated sulfuric acid in 20 ml. of water is heated for 1¼ hours on a steam cone. After cessation of the nitrogen evolution, the phenolic ketone appears as an orange oil, which solidifies on cooling. The solid phenolic ketone is dissolved in ether and extracted with aqueous potassium hydroxide, and the alkaline extract neutralized carefully with hydrochloric acid. The resulting yellow precipitate is recrystallized from alcohol-water and then sublimed at 160° C. and 0.03 mm. to yield 7.6 g. of spiro[cyclohexane-1,1'-x-hydroxyindanone-3'] which melts at 159–160° C.

Spiro[cyclohexane - 1,1' - x - hydroxyindanone-3'] (5 g.) is added to a mixture of hydroxylamine hydrochloride (5 g.), pyridine (14 ml.), and anhydrous alcohol (30 ml.), and the solution is refluxed for 2½ hours. Removal of the solvent under reduced pressure, and recrystallization of the crystalline mass from alcohol-water mixtures affords the oxime of spiro[cyclohexane-1,1'-x-hydroxyindanone-3'] (5 g.) which melts at 182–184° C.

The oxime of spiro[cyclohexane-1,1'-x-hydroxyindanone-3'] (13 g.) is hydrogenated at room temperature and 20 pounds of hydrogen with 0.5 g. of platinum oxide as a catalyst in 100 ml. of glacial acetic acid. After cessation of hydrogen absorption, the catalyst is removed by filtration. The filtrate is cooled and neutralized with ammonium hydroxide to yield a white crystalline precipitate. After crystallization from 50% alcohol-water mixtures, 10 g. of spiro[cyclohexane - 1,1' - 3' - amino - x - hydroxyindane] is obtained which melts at 227–228° C.

This compound has the formula:

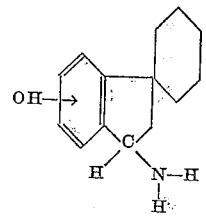

EXAMPLE V(a)

The compound of Example V may be prepared by an alternative method, as follows:

Spiro[cyclohexane - 1,1' - 3' - aminoindane] can be nitrated as the N-acetyl derivative in a solution of carbon tetrachloride with ether fuming nitric acid or a mixture of potassium nitrate and sulfuric acid. The resulting nitro-N-acetyl-amine can be isolated in the usual manner and subsequently reduced with a variety of reducing agents, for example, $CnCl_2 2H_2O + HCl$, to the corresponding diamine; spiro[cyclohexane-1,1'-3'-acetylamino-x-aminoindane]. The diamine in turn can be diazotized in the usual manner and then heated to reflux for about 24 hours with a 50% solution of $H_2SO_4$ and then cooled and neutralized with $NH_4OH$ to yield spiro[cyclohexane-1,1'-3'-amino-x-hydroxyindane].

EXAMPLE VI

The compound of Example IV may be obtained by another method, as follows:

A mixture of spiro[cyclohexane-1,1'-3'-amino-x-hydroxyindane] (0.5 g.) and 0.5 g. of 87% formic acid is cooled and to the cooled solution, 0.4 g. of 37% formaldehyde is added. Warming on a steam cone caused an evolution of carbon dioxide; heating is continued for twelve hours. The solution is concentrated under reduced pressure and then neutralized with ammonium hydroxide to yield a yellow precipitate. Crystallization of the compound from acetone affords a white crystalline compound which melts at 169-170° and gives no depression in a mixed melting point determination with spiro[cyclohexane - 1,1' - 3' - dimethylamino - x - hydroxyindane] prepared as indicated earlier.

EXAMPLE VII

A compound of the type:

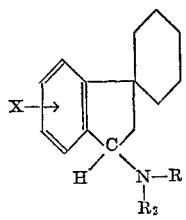

wherein X is a halogen and R₁ and R₂ are methyl groups may be prepared as follows:

Spiro[cyclohexane - 1,1' - x - amino - 3' - dimethylaminoindane] can be diazotized as indicated in Example III. The diazonium salt solution is then treated with potassium iodide and the mixture stirred at room temperature until the evolution of nitrogen ceases. Isolation in the usual manner affords spiro[cyclohexane-1,1'-3-dimethylamino-x-iodoindane].

EXAMPLE VIII

A compound of the type:

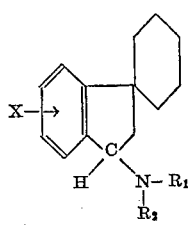

wherein X is methoxy and R₁ and R₂ are methyl groups as may be prepared as follows:

Spiro [cyclohexane - 1,1' - 3' - dimethylamino-x-hydroxyindane] is dissolved in an aqueous solution of potassium hydroxide and the solution is refluxed. Dimethyl sulfate is added dropwise to the refluxing mixture and after several additional hours, the mixture is cooled and extracted with ether. The dried ether extract is then concentrated under reduced pressure to yield spiro-[cyclohexane-1,1'-3'-dimethylamino - x - methoxyindane].

EXAMPLE IX

A compound of the type:

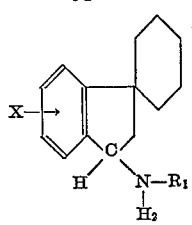

where X is acetate and R₁ and R₂ are methyl groups may be prepared as follows:

Spiro [cyclohexane - 1,1' - 3' - dimethylamino-x-hydroxyindane] is dissolved in 4 molar equivalents of acetic anhydride and then a catalytic amount of pyridine added. After several days at room temperature, the solvent is removed under reduced pressure to yield spiro [cyclohexane-1,1'-x-acetoxy-3'-dimethylaminoindane].

EXAMPLE X

A compound having the formula:

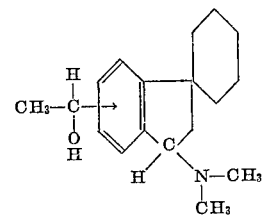

may be prepared as follows:

Spiro [cyclohexane - 1,1' - 3' - dimethylamino-x-(1-hydroxyethyl)indane]. To an efficiently stirred solution of 20 ml. of 1.3 molar lithium aluminum hydride in ether was added dropwise 3 g. of spiro(cyclohexane - 1,1' - x - acetyl-3'-dimethylaminoindane) in 100 ml. of anhydrous ether. After the addition, the mixture was stirred for an additional half hour and then sufficient water was added in the cold to just decompose the excess reagent and the complex. The ether layer was washed with water, dried over anhydrous magnesium sulfate, and after removal of the drying agent, concentrated to give 3 g. of the hydroxy compound. Since the substance was difficult to handle, the hydrochloride was prepared by passing dry hydrogen chloride gas through an ether solution of the amine and after recrystallization from alcohol-ether mixtures melted at 245-247°.

EXAMPLE X(a)

A compound having the formula:

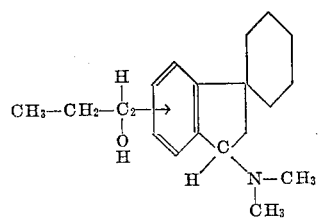

may be prepared as follows:

Spiro [cyclohexane - 1,1' - 3' - dimethylamino-x-(1-hydroxybutyl)indane]. In the same manner as above 3.4 g. of spiro(cyclohexane-1,1'-x-(n-butyryl)-3'-dimethylaminoindane) was reduced with lithium aluminum hydride to yield 3.4 g. of the hydroxy compound which was then converted to the hydrochloride, M. P. 210-211°, after recrystallization from alcohol-ether mixtures.

EXAMPLE XI

A compound having the formula:

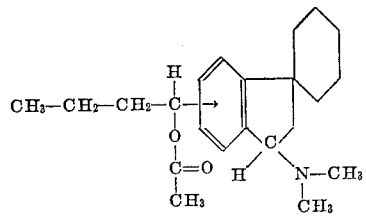

may be prepared as follows:

Spiro [cyclohexane - 1,1' - 3' - dimethylamino-x(1-hydroxybutyl)indane] (0.9 g.) was mixed with 5 ml. of acetic anhydride and 1 ml. of pyridine. The mixture was heated slightly on a steam cone to affect solution and then allowed to stand at room temperature for three days. The solvent was then removed under reduced pressure to yield as a very viscous oil, the acetyl ester of spiro [cyclohexane-1,1'-3'-dimethylamino-x(1-hydroxybutyl)indane].

In the same manner the propionyl ester was formed using propionic anhydride and pyridine on the amino-alcohol.

EXAMPLE XII

A compound having the formula:

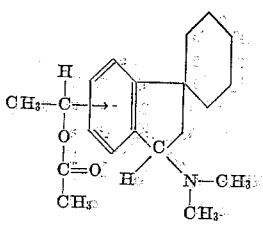

may be prepared as follows:

Spiro [cyclohexane-1,1'-3'-dimethyl amino-x(1-hydroxyethyl)indane] (1.1 g.) in 20 ml. of anhydrous ether was added dropwise to the Grignard reagent prepared from 1.27 g. of ethyl iodide and 0.2 g. of magnesium. After stirring the reaction at room temperature for an additional hour, 1.1 ml. of acetic anhydride in 20 ml. of anhydrous ether was added dropwise and the mixture stirred for 22 hours. The mixture was decomposed on ice and ammonia and the ether layer was washed and dried with anhydrous magnesium sulfate. The dried ether solution was concentrated to yield 0.5 g. of the oily ester.

In the same manner the propionyl ester was formed using propionic anhydride in place of acetic anhydride.

EXAMPLE XIII

A compound having the formula:

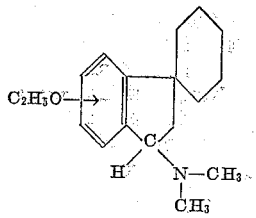

may be prepared as follows:

Spiro [cyclohexane-1,1'-3'-dimethylamino-x-ethoxyidane]. To a cooled solution of 5 ml. of 90% formic acid and 6 ml. of 40% formaldehyde was added 2.1 g. of spiro(cyclohexane-1,1'-3'-amino-x-ethoxyindane) hydrochloride and then the mixture was slowly warmed on a steam bath until the evolution of carbon dioxide had ceased. The mixture was then concentrated under reduced pressure, made alkaline, and extracted with ether. The ether layer was extracted with dilute hydrochloric acid, which in turn was neutralized, extracted with ether and the ether extract dried over anhydrous magnesium sulfate. After removal of the drying agent, dry hydrogen chloride gas was passed into the solution to give 2 g. of crystalline amine hydrochloride, which after recrystallization from acetone melted at 211–213°.

EXAMPLE XIV

A compound having the formula:

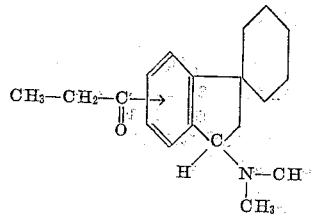

may be prepared as follows:

Spiro [cyclohexane-1,1'-x-propionyl-3'-dimethylaminoindane]. In the same manner as above, 7 g. of the amine, 14 g. of anhydrous aluminum chloride, and 4.3 g. of propionic anhydride was allowed to react in carbon disulfide to produce 1.5 g. of spiro [cyclohexane-1,1'-x-propionyl-3'-dimethylaminoindane] B. P. 155°/0.5 mm., M. P. 56–58° from petroleum-ether (20–40°).

The hydrochloride made in the usual manner was recrystallized from alcohol ether mixtures and melted at 252–255°.

EXAMPLE XV

A compound having the formula:

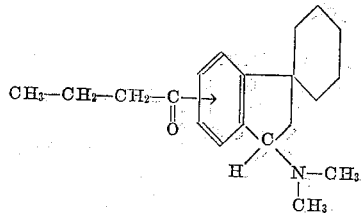

may be prepared as follows:

Spiro [cyclohexane-1,1'-x(n-butyryl)-3'-dimethylaminoindane]. In the same manner as above, 7 g. of the amine, 11 g. of anhydrous aluminum chloride, and 3.5 g. of n-butyryl chloride was allowed to react in carbon disulfide to produce 4.4 g. of spiro [cyclohexane-1,1'-x-(n-butyryl)-3'-dimethylaminoindane]; B. P. 150°/0.4 mm., M. P. 48–49° from petroleum-ether (20–40°).

The hydrochloride made in the usual manner was recrystallized from alcohol-ether mixtures and melted at 215–218° C.

EXAMPLE XVI

A compound having the formula:

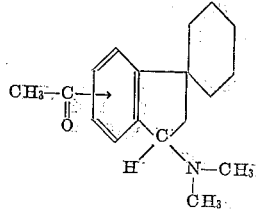

may be prepared as follows:

Spiro [cyclohexane-1,1'-x-acetyl-3'-dimethylaminoindane]. A solution of 8 g. of acetic anhydride in 30 ml. of carbon disulfide was added with vigorous stirring to a mixture of 14 g. of spiro [cyclohexane-1,1'-3'-dimethylaminoindane], 30 g. of anhydrous aluminum chloride and 130 ml. of carbon disulfide. A vigorous reaction ensued, which caused hydrogen chloride to be evolved, and which caused the carbon disulfide to reflux. After the initial reaction had subsided, the mixture was refluxed for an additional eighteen hours. The cooled mixture was then poured with stirring into an ice-sodium hydroxide solution and the organic layer extracted with ether. The ether layer was extracted with dilute hydrochloric acid, the aqueous layer made alkaline, extracted with ether, and dried over anhydrous magnesium sulfate. After removal of the drying agent by filtration, distillation yielded 5 g. of unreacted amine (B. P. 96–106°/.08–.09) and 5.7 g. of spiro [cyclohexane-1,1'-x-acetyl-3'-dimethylaminoindane] which boiled at 145–160° at 1 mm. The ketoamine was crystallized from petroleum ether (20–40°) in a Dry Ice bath and after two sublimations melted at 90–92°.

The hydrochloride made in the usual manner was recrystallized from methanol-ether mixtures and melted at 254–255° (decomp.).

EXAMPLE XVII

A compound having the formula:

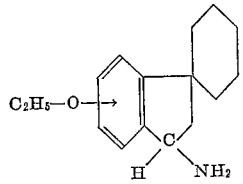

may be prepared as follows:

Spiro [cyclohexane - 1,1'-x-nitroindanone-3']. Ten grams of potassium nitrate in 30 ml. of concentrated sulfuric acid was added dropwise with stirring to a solution of 13.2 g. of spiro [cyclohexane-1,1'-indanone-3'], in 100 ml. of concentrated sulfuric acid cooled to 0° by means of an ice-salt bath. This addition took one and a quarter hours and at no time was the temperature greater than 5°. The mixture was stirred an additional hour at 0° and poured with stirring onto cracked ice. The yellow solid was washed with water, dissolved in 500 ml. of hot acetone, clarified and allowed to crystallize slowly overnight. In this manner, 13.7 g. of yellow hexagonal crystals melting at 193–194° were obtained, concentration of the mother liquors and finally addition of water produced further fractions which melted at 193–194° and gave no mixed melting point depression with the first fraction. Each fraction was then recrystallized from acetone, benzene, and then acetone, but in each case the melting point was 195–195.5° and gave no mixed melting point depression with other fractions. It seems probable therefore that nitration of the ketone under these conditions led to a single positional isomer. The total yield of spiro [cyclohexane-1,1'-x-nitroindanone-3'] was 18 g. or 83%.

Spiro [cyclohexane-1,1' - x - aminoindanone-3']. To a refluxing solution of 14.1 g. of the nitroketone in 90 ml. of 95% alcohol was added dropwise, with stirring, 41 g. of stannous chloride dihydrate in 40 ml. of concentrated hydrochloric acid and 20 ml. of 95% alcohol. After the addition, the yellow solution was refluxed an additional thirty minutes and then concentrated under reduced pressure. The residue was made strongly alkaline with potassium hydroxide so that all of the stannic hydroxide remained in solution and the solution extracted with ether. The ether extracts were washed until neutral and then dried over anhydrous magnesium sulfate. After removal of the drying agent and concentration of the solution, a yellow solid was obtained which, after crystallization from benzene-petroleum ether (90–100°), yielded 11 g. or 82% of spiro [cyclohexane-1,1' - x - aminoindanone-3'] melting at 116–118°. Further recrystallization from methanol-water mixtures and finally sublimation of 120° and 0.5 mm. produced a nearly white crystalline compound melting at 125–126°.

The amino-ketone (10 g.) with 10 g. of hydroxylamine hydrochloride in 55 ml. of absolute alcohol and 23 ml. of pyridine was refluxed for three hours. The solution was concentrated to dryness under reduced pressure and the residue dissolved in alcohol, clarified, filtered, and the oxime precipitated by the slow addition of water. The oxime of spiro [cyclohexane-1,1'-x-aminoindanone-3'] (10 g.) so obtained was recrystallized from methanol-water mixtures and melted at 178–180°.

Spiro [cyclohexane - 1,1'-x-hydroxyindanone-3']. A slurry of 10.5 g. of the aminoketone in 11 ml. of concentrated sulfuric acid and 80 ml. of water was stirred and cooled to 0° and 3.5 g. of sodium nitrite in 20 ml. of water was added dropwise over a period of forty-five minutes. When a persistent test for nitrous acid was obtained, urea was added to destroy the excess nitrous acid. The solution was filtered and 5 ml. of concentrated sulfuric acid in 20 ml. of water was added to the filtrate and the solution heated on a steam bath for one and a quarter hours. The oily top layer which was formed from this reaction solidified on cooling. The crude brown hydroxyketone was dissolved in ether, the ether layer extracted with aqueous potassium hydroxide, clarified with charcoal, filtered and neutralized in the cold with hydrochloric acid to produce 7.6 g. or 72% of yellow crystalline spiro [cyclohexane-1,1'-x-hydroxyindanone-3']. Further recrystallization from alcohol-water mixtures and finally sublimation at 160° and 0.03 mm. yielded a slightly yellow compound melting at 159–160°.

Spiro [cyclohexane-1,1' - x - ethoxyindanone-3']. The hydroxyketone was ethylated with diethyl sulfate according to the directions for the preparation of vertraldehyde. The product was isolated by ether extraction of the alkaline medium. After drying and removal of the solvent the residue was distilled at 155°/0.7 mm. Spiro [cyclohexane-1,1'-x-ethoxyindanone-3'] so obtained, solidified and after recrystallization from petroleum ether (30–60°) and sublimation at 80° and 0.1 mm. melted at 68–70°.

The yield of this reaction was low, however, the starting hydroxy ketone could be recovered by acidification of the original reaction medium after the extraction with ether.

The oxime of spiro [cyclohexane-1,1'-x-ethoxyindanone-3'] prepared in the usual manner, recrystallized from alcohol-water mixtures, and finally sublimed at reduced pressure melted at 151.5–152°.

Spiro [cyclohexane - 1,1'-3'-amino-x-ethoxyindane]. The oxime of spiro [cyclohexane-1,1' x-ethoxyindanone - 3'] (2.7 g.) in 50 ml. of glacial acetic acid was hydrogenated at room temperature and 25 pounds of hydrogen using 1.1 g. of Adams' catalyst. After cessation of the absorption of hydrogen, the catalyst was filtered and the filtrate was cooled and made alkaline. The alkaline solution was extracted with ether, dried with anhydrous magnesium sulfate, and concentrated to dryness after removal of the drying agent. The remaining brown oil was converted into the amine hydrochloride by passing hydrogen chloride gas through a dry ether solution of the amine. Recrystallization from methanol-ether mixtures produced 2.8 g. of spiro-[cyclohexane- 1,1'-3'-amino-x-ethoxyindane] hydrochloride melting at 234–237°.

EXAMPLE XVIII

A compound having the formula:

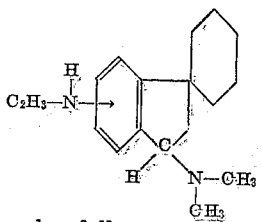

may be prepared as follows:

Spiro [cyclohexane-1,1'-3-dimethylamino-x-ethylaminoindane]. A solution of 1.5 g. of the N-acetyl derivative of spiro [cyclohexane-1,1'-x-amino-3'-dimethylaminoindane] (prepared by the reaction of this diamine with acetic anhydride in the presence of pyridine in the manner which is well known to those skilled in the art, and having a melting point of 183–184° C. after three recrystallizations from acetone):

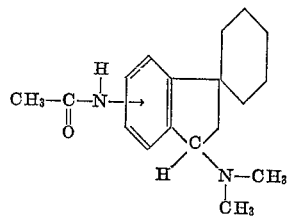

in 50 ml. of anhydrous benzene was added dropwise to 12 ml. of 1.3 molar lithium aluminum hydride in ether. The mixture was stirred and refluxed for 18 hours and then decomposed in the cold with water. The organic layer was dried and concentrated to give 1.3 g. of red oil which formed a dihydrochloride when dry hydrogen chloride gas was passed into a dry ether solution of the diamine. This salt was recrystallized from alcohol-ether mixtures and melted at 183–188° (decomp.).

EXAMPLE XIX

A compound having the formula:

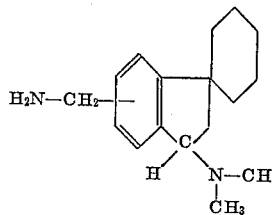

may be prepared as follows:

Spiro [cyclohexane 1,1'-x-cyano-3'-dimethylaminoindane] (2.5 g.) in 50 ml. of anhydrous ether was added dropwise to 20 ml. of 1.3 molar lithium aluminum hydride in anhydrous ether. After the addition, the mixture was stirred for another hour at room temperature. The mixture was then cooled in an ice bath and decomposed with water. The ether layer was separated and concentrated to dryness. The resulting brown oil was treated with benzoyl chloride and sodium hydroxide to form the solid N-benzoyl derivative. The solid was filtered, washed thoroughly with cold alcohol and then hydrolyzed by boiling with 50 ml. of concentrated hydrochloric acid and 50 ml. of water for ninety-six hours. The cooled acid solution was extracted with ether and the ether layer rejected. The aqueous acid layer was carefully neutralized and the neutral solution extracted with ether. The dried ether solution was concentrated to give 1.2 g. of spiro [cyclohexane 1,1'-x-aminomethyl-3'-dimethylaminoidane].

In the foregoing examples it will be understood that in lieu of the methyl group other lower alkyl groups such as ethyl, propyl, etc., may be incorporated in the molecule by proper selection of the reaction materials in the manner obvious to those skilled in the art. Likewise, it will be understood that the alkoxy group may be methoxy, ethoxy, propoxy, etc., the acyl group may be acetyl, propionyl, butyryl, etc., and the halogen may be the chloride, bromide, iodide, fluoride, etc.

The term M. E. D. is used herein as an abbreviation for the minimal effective dosage for 50% of the animals tested. The term L. $D_{50}$ is used herein as an abbreviation for the lethal dosage for 50% of the animals tested.

It will be understood that other modifications may be made in the foregoing examples without departing from the scope of the invention. It is intended, therefore, that the patent shall cover by suitable expression in the appended claims the features of patentable novelty residing in the invention.

This application is a continuation-in-part of application Serial No. 150,809, filed March 20, 1950, now abandoned.

We claim:

1. A compound represented by the formula

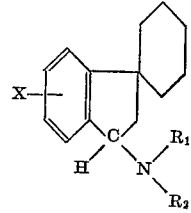

in which $R_1$ and $R_2$ are selected from the group consisting of H- and lower alkyl-, and X represents a member of the group consisting of lower alkyl-O, lower alkyl-COO, lower alkyl-CO, hydroxy lower alkyl, and lower fatty acid ester of a hydroxy lower alkyl.

2. A compound represented by the formula

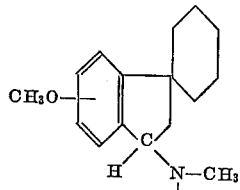

3. A compound represented by the formula

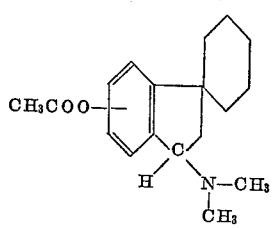

4. A compound represented by the formula

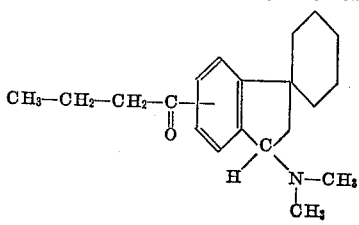

5. A compound represented by the formula
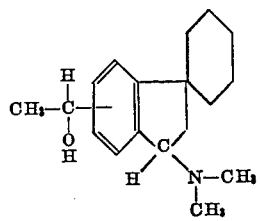
6. A compound represented by the formula
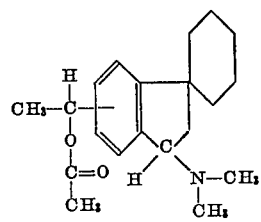
GILBERT FORREST WOODS, JR.
LOUIS H. SCHWARTZMAN.
References Cited in the file of this patent
OTHER REFERENCES
Schwartzman, Jour. Organic Chem. 15, 517–524 (1950).